(12) United States Patent
Deng et al.

(10) Patent No.: US 8,908,903 B2
(45) Date of Patent: Dec. 9, 2014

(54) IMAGE RECOGNITION TO SUPPORT SHELF AUDITING FOR CONSUMER RESEARCH

(75) Inventors: Kevin Keqiang Deng, Oldsmar, FL (US); Wei Xie, Woodridge, IL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 604 days.

(21) Appl. No.: 13/222,763

(22) Filed: Aug. 31, 2011

(65) Prior Publication Data
US 2013/0051667 A1 Feb. 28, 2013

(51) Int. Cl.
G06K 9/00 (2006.01)
G06K 9/62 (2006.01)

(52) U.S. Cl.
CPC .......... G06K 9/00691 (2013.01); G06K 9/6203 (2013.01)
USPC ............................ 382/100; 382/170; 382/209

(58) Field of Classification Search
USPC ........................... 382/100, 168, 170, 209, 305
See application file for complete search history.

(56) References Cited

U.S. PATENT DOCUMENTS

| | | | |
|---|---|---|---|
| 6,026,377 A | 2/2000 | Burke | |
| 6,281,874 B1 | 8/2001 | Sivan et al. | |
| 6,304,855 B1 | 10/2001 | Burke | |
| 6,381,510 B1 | 4/2002 | Amidhozour et al. | |
| 6,577,346 B1 | 6/2003 | Perlman | |
| 6,633,651 B1 | 10/2003 | Hirzalla et al. | |
| 6,708,156 B1 | 3/2004 | Gonten | |
| 7,353,188 B2 | 4/2008 | Yim et al. | |
| 8,009,864 B2 | 8/2011 | Linaker et al. | |
| 2006/0153296 A1 | 7/2006 | Deng | |
| 2006/0237532 A1 | 10/2006 | Scott-Leikach et al. | |
| 2008/0068622 A1 | 3/2008 | Deng et al. | |
| 2008/0140478 A1 | 6/2008 | Goldberg et al. | |
| 2009/0059270 A1* | 3/2009 | Opalach et al. | 358/1.15 |
| 2009/0063307 A1 | 3/2009 | Groenovelt et al. | |
| 2009/0121017 A1 | 5/2009 | Cato et al. | |
| 2009/0123069 A1 | 5/2009 | Deng et al. | |
| 2009/0240735 A1 | 9/2009 | Grandhi et al. | |
| 2010/0171826 A1* | 7/2010 | Hamilton et al. | 348/135 |
| 2011/0055054 A1 | 3/2011 | Glasson | |
| 2011/0184972 A1 | 7/2011 | Ard et al. | |
| 2011/0243459 A1 | 10/2011 | Deng | |

FOREIGN PATENT DOCUMENTS

JP 2002312652 10/2002

OTHER PUBLICATIONS

U.S. Appl. No. 12/754,361, filed Apr. 5, 2010 (65 pages).
Leukel, Joerg, "Automating Product Classification: The Impact of Standardization," IADIS International Conference e-Society 2004, (8 pages).

(Continued)

Primary Examiner — Phuoc Tran
(74) Attorney, Agent, or Firm — Hanley, Flight & Zimmerman, LLC

(57) ABSTRACT

Image recognition methods, apparatus and articles or manufacture to support shelf auditing for consumer research are disclosed herein. An example method disclosed herein comprises comparing an input image depicting a shelf to be audited with a set of reference images depicting reference shelves displaying respective sets of reference items, identifying a first reference image from the set of reference images that has been determined to match the input image, and determining an initial audit result for the shelf depicted in the input image based on a first set of reference items associated with the first reference image.

17 Claims, 9 Drawing Sheets

(56) References Cited

OTHER PUBLICATIONS

"Product, Services, and Branding Strategy," Chapter 8, PowerPoint Presentation, downloaded from www.slideshare.net on Jul. 30, 2011 (28 pages).

Murdoch, Peter L., "Sentry Technology Signs LOI With Orions Digital," Press Release on Mar. 15, 2011, Yahoo Finance, http://finance.yahoo.com/news/Sentry-Technology-Signs-LOI-iw-2384033886.html?x=0&, accessed on Jul. 30, 2011, (2 pages).

Probst et al., "Extracting and Using Attribute-Value Pairs from Product Descriptions on the Web," B. Berendt et al. (Eds.): WebMine 2006, LNAI 4737, (20 pages).

International Searching Authority, "International Search Report and Written Opinion", issued in connection with International Application No. PCT/US2012/051582, dated Mar. 15, 2013 (12 pages).

International Searching Authority, "International Preliminary Report on Patentability", issued in connection with International Application No. PCT/US2012/051582, dated Mar. 4, 2014 (8 pages).

* cited by examiner

IMAGE RECOGNITION TO SUPPORT SHELF AUDITING FOR CONSUMER RESEARCH

FIELD OF THE DISCLOSURE

This disclosure relates generally to consumer research and, more particularly, to image recognition to support shelf auditing for consumer research.

BACKGROUND

Shelf auditing, such as in the context of store auditing, plays an important part in marketing research. Shelf auditing can be used to report the items (e.g., goods) displayed in a store, where these items are displayed, how many items are displayed, etc. Prior shelf auditing techniques rely on human auditors to identify and register each item in a store. In some prior techniques, photographs of shelves to be audited are taken by personnel assigned to particular locations (e.g., stored) and sent back to a central location where the items in the photographs are identified and registered manually by one or more auditors.

DETAILED DESCRIPTION

Figure 1:
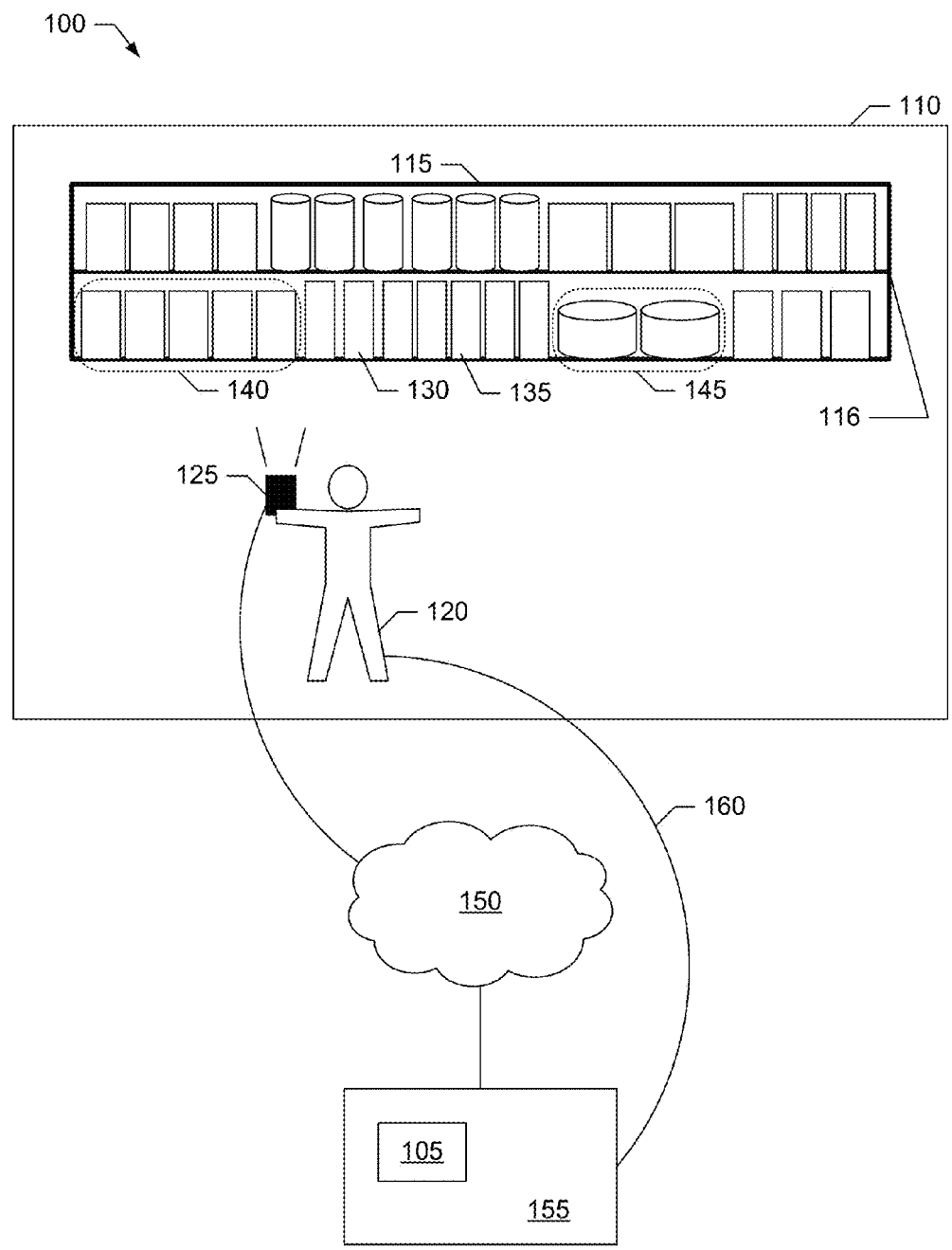
FIG. 1 is block diagram of an example environment of use for an example image processing system capable of supporting shelf auditing for consumer research as disclosed herein.

Image recognition methods, apparatus/systems and articles of manufacture to support shelf auditing for consumer research are disclosed herein. An example image processing system to support shelf auditing for consumer research disclosed herein includes an example reference image identifier to receive an input image depicting a shelf to be audited. The example reference image identifier compares the input image to a set of reference images (e.g., beginning with the most recent reference images) representing a respective set of reference shelves displaying respective sets of reference items, and identifies a first reference image from the set of reference images that has been determined to match the input image. The set of reference images and the respective sets of reference items associated with the respective reference images are obtained from prior shelf audits. In some examples, to assist reference image comparison, the location of the shelf being audited, relative to the store, is registered with the input image when it is taken, and the registered location is used to select reference image(s) having the same or a similar location for comparison with the input image. The example image processing system also includes an example image auditor to determine an initial audit result for the shelf depicted in the input image based on a first set of reference items associated with the first reference image.

In some example, the image auditor determines the initial audit result for the shelf depicted in the input image only if the first reference image is determined to match the input image (e.g., based on comparison of image signatures) and a matching criterion is satisfied. However, if the matching criterion is not satisfied, then the image auditor indicates that the shelf depicted in the input image corresponds to a new shelf for which determination of the initial audit result was unsuccessful (e.g., and, thus, the input image depicting the shelf is to be audited manually).

The set of reference images is associated with a respective set of reference image signatures, and to compare the input image to the set of reference images, the reference image identifier determines an input image signature from the input image, and compares the input image signature with the set of reference image signatures. In such an example, the first reference image has a reference image signature from the set of reference image signatures that is determined to match the input image signature (e.g., based on distance, correlation, etc). The image signatures can take the form of, for example, a sequence of digital values that consume less storage than the original image (e.g., such as a sequence of values representing one or more characteristics of image), a waveform, a thumbnail image, a histogram, etc. Furthermore, in some examples, the reference image that is determined to match the input image may have one or more regions that differ from corresponding regions in the input image.

In some examples, the image processing system additionally includes an example difference detector to determine a first region of the input image that differs from a corresponding first region of the first reference image (e.g., which is the reference image that was determined to match to the input image). In such an example, the image auditor can modify the initial audit result for the shelf depicted in the input image based on an item depicted in the first region of the input image. Modifying the initial audit result can include, for example, identifying the item depicted in the first region of the input image and registering the item as being associated with the shelf depicted in the input image. In some examples, the difference detector determines the first region of the input image that differs from the corresponding first region of the first reference image by performing image registration to cause the input image to coincide with the first reference image (e.g., in terms of size, shape, spatial orientation, etc.), determining a difference image representing differences between respective pixels in the input image and the first reference image, and determining the first region to contain a group of neighboring pixels of the difference image that meet or exceed a difference threshold.

In some examples, such as when the first region of the input image (which corresponds to a difference region between the input image and the first reference image) depicts a group of retail products (e.g., located on a store shelf), a region selected in the input image to represent a single item can be used as an item template. In such an example, the image processing system can identify a number of similar items depicted in the first region of the input image by identifying a first product template image that matches a subregion of the first region of the input image (e.g., and, thus, that corresponds to an instance of a matching item), and then comparing the first product template image to neighboring regions of the subregion to identify one or more other subregions of the input image that also match the first product template image (e.g., and, thus, that corresponds to another instance of the same matching item).

Prior, manually intensive techniques for self auditing rely on human beings to correctly identify items on the shelves to be audited. As such, these prior techniques can be labor intensive, inefficient and prone to human error. Unlike prior manual techniques for shelf auditing, the examples disclosed herein utilize image processing to automate (or at least partially automate) shelf auditing for consumer research. Such automation can result in improved efficiency and quality (e.g., accuracy), and/or reduced costs, relative to the prior, manually-intensive shelf auditing techniques. Additionally, because shelf auditing in accordance with the examples disclosed herein is based on processing images of the shelves to be audited, the auditing of a shelf can take place at a remote facility (e.g., and can be batched with auditing of other shelves from the same and/or other locations), rather than being performed by the auditor during a visual inspection of the shelf. Furthermore, example shelf auditing methods, apparatus and articles of manufacture disclosed herein can direct the human auditor auditing an image of a shelf to only those items that have not been previously registered as being associated with that shelf by exploiting redundancies, such as a) the fact that items displayed on shelved often do not change between audits, and b) the fact that similar items are usually displayed in groups on the shelves being audited.

Turning to the figures, a block diagram of an example environment of use 100 in which an example image processing system 105 can support shelf auditing for consumer research as described herein is illustrated in FIG. 1. In the illustrated example, the environment of use 100 includes an example establishment 110 that includes items 115 on the shelves 116 to be audited. For example, the establishment 110 could correspond to any type of retail or wholesale establishment (e.g., a grocery store, a department store, a clothing store, a specialty store, a hardware store, etc.) and/or other establishment (e.g., a museum, gallery, etc.) containing items 115 on display and that can be audited. Furthermore, although the examples disclosed herein are described in the context of auditing items 115 on shelves 116, the example can also be used to audit items 115 arranged for display using apparatus other than the shelves 116. In such an example, auditing may be tied to a particular location rather than to a particular shelf 116. The items 115 can correspond to any type of goods, products, things, etc., having one or more attributes/characteristics that can be used to describe the items 115. For example, if the establishment 110 corresponds to a grocery store 110, the items 115 can correspond to consumer products displayed on store shelving 116 and/or inventory kept in a storeroom or other storage location.

To facilitate shelf auditing of the items 115 using the image processing system 105, an example auditor 120 visits the establishment 110 with an example imaging device 125 to capture images of the items 115 displayed on the shelves 116. The imaging device 125 can correspond to, for example, a digital camera, a mobile phone/smartphone, a personal digital assistance (PDA), etc. In the illustrated example, the auditor 120 can use the imaging device 125 to capture image(s) depicting one or more of the shelves 116, or one or more portions of the shelves 116, or any combination thereof, containing the items 115. For example, the auditor 120 can use the image device 125 to capture a first image depicting a first shelf 116 in the set of shelves 116, a second image depicting a second shelf 116 in the set of shelves 116, etc., and so on. Additionally or alternatively, the auditor 120 can use the imaging device 125 to capture image(s) depicting groups of items 115 displayed on the shelves 116 being audited. For example, the auditor 120 can use the image device 125 to capture a first image depicting a first group 140 of items on the shelves 116, a second image depicting a second group 145 of items in the shelves 116, etc., and so on.

The image(s) captured by the auditor 120 using the imaging device 125 are provided as input image(s) to the image processing system 105 to support shelf auditing and registration of the item(s) depicted in the input images. For example, the imaging device 125 can capture and store images in any appropriate digital format. If the imaging device 125 supports data networking, the captured images can be sent by the imaging device 125 via an example network 150 to an example remote processing facility 155 containing the image processing system 105. For example, the imaging device 125 can include one or more networking transceivers capable of communicating with the network 150 and transmitting the captured images via the network to the image processing system 105 located at the processing facility 155. Additionally or alternatively, the imaging device 125 may communicatively couple with a docketing station (not shown) or similar interface connected to a computer or other device capable of downloading the captured images from the imaging device 125 to the image processing system 105 via the network 150. The network 150 can be implemented by any type and/or number of communication networks, such as one or more of the Internet, a local area network (LAN), a wide area network (WAN), a wireless network, a mobile telephony network, etc.

In some examples, the auditor 120 may cause the images captured by the imaging device 125 to be provided to the image processing system 105 located at the processing facility 155 without using the network 150. Such a procedure is illustrated by a line 160 depicted in FIG. 1. For example, the auditor 120 may hand-deliver the imaging device 125 containing the captured images to the processing facility 155. Additionally or alternatively, the auditor 120 may download the captured images from the imaging device 125 to a portable memory device (not shown), such as a memory stick, a thumb drive, etc., that can be delivered by the auditor 120 or an intermediary (e.g., such as a delivery service, a postal carrier, etc.) to the processing facility 155.

As described in greater detail below, the image processing system 105 processes input image(s) captured by the imaging device 125 to automate auditing of the shelve(s) 116 and registration of item(s) 115 depicted in the input images. Shelf auditing as performed by the image processing system 105 involves automatically identifying the items 115 on shelve(s) 116 and/or or portion(s) of shelves 116 included in an input image, registering items 115 associated with a particular shelf 115, modifying auditing a shelf 115 to enable identification and registration of item(s) 115 not previously associated with the shelf 116, etc. The image processing system 105 codes an item by assigning it with an identifier (ID), which is retrieved by using its appearance and/or textual features if the item has been coded previously and recorded in a product database (which is not illustrated in FIG. 1). When such an ID cannot be retrieved, the image processing system 105 will apply for new unique ID and record the association of the item and its appearance and textual features along with other descriptions in the database. The ID can correspond to any form of coding scheme to represent the items 115 displayed on a shelf. For example, the system 105 can use a standardized code, such as a universal product code (UPC), to represent an item 115, or a proprietary code to represent an item 115, and alphanumeric string to represent an item 115, etc., or any combination thereof.

Figure 2:
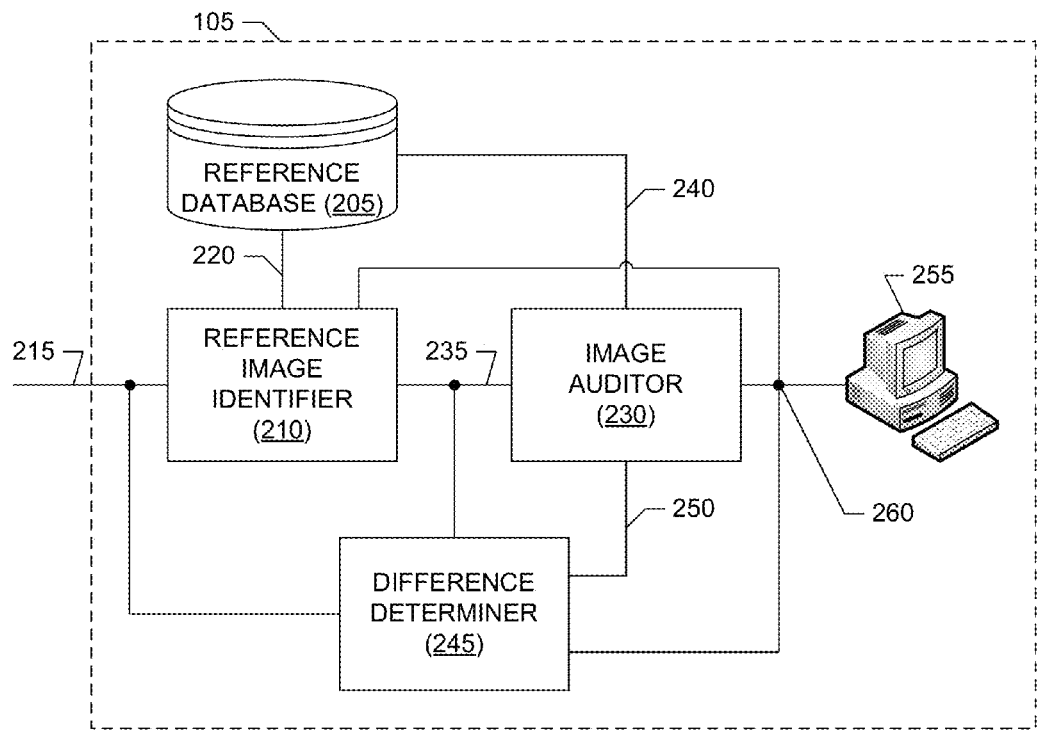
FIG. 2 is a block diagram of an example implementation of the image processing system of FIG. 1.

A block diagram of an example implementation of the image processing system 105 of FIG. 1 is illustrated in FIG. 2. The example image processing system 105 of FIG. 2 includes an example reference database 205 to store reference images depicting shelves, for example, corresponding to shelves that have already been audited along with their corresponding appearance and textual features, and IDs assigned to each item/location depicted in their corresponding image. This information is collectively referred to as the reference data. These shelves are referred to as reference shelves and are associated with the respective reference data in the reference database 205. The items registered as being associated with the reference shelves corresponding to the reference images are referred to as reference items. The set of reference data are stored in the reference database 205 and used by the image processing system 105 to automate auditing of a shelf depicted in an input image provided to the image processing system 105. The reference database 205 can store the set of reference data using any type of database and/or other data format, structure, representation, etc. The reference database 205 can be implemented using any type or combination of memory and/or storage devices, such as one or more of the mass storage device 1130 and/or the volatile memory 1118 of the example processing system 1100 of FIG. 11, which is described in greater detail below.

Figure 3:
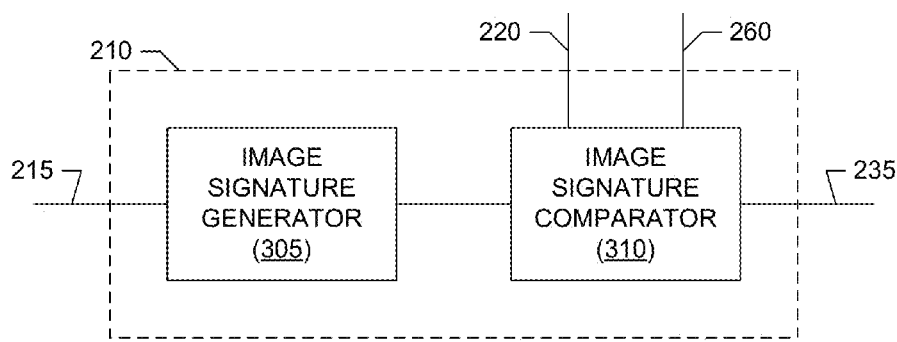
FIG. 3 is a block diagram of an example reference image identifier that may be used to implement the example image processing system of FIG. 2.

The example image processing system 105 of FIG. 2 also includes an example reference image identifier 210 to compare an input image obtained via an input image interface 215 with a set of reference images obtained from the reference database 205 via a reference image interface 220. The input image obtained via the input image interface 215 corresponds to an image captured by the imaging device 125 and that depicts a shelf (or portion thereof) to be audited. As such, the input image is also referred to herein as the input shelf image. In the illustrated example, the reference image interface 220 uses any appropriate type or combination of image comparison techniques to compare the input image with the set of reference images to identify a particular reference image that is a closest match, or at least a sufficiently close match (referred to as a sufficient match) based on one or more matching criteria, to the input image. In some examples, the reference image interface 220 is further configured with one or more matching criteria that is/are to be met by the particular reference image in order for it be identified by the reference image interface 220 as a suitable reference for use in auditing of the shelf depicted in the input image. An example implementation of the reference image identifier 210 is illustrated in FIG. 3, which is described in greater detail below.

The example image processing system 105 of FIG. 2 also includes an example image auditor 230 to identify and regis-
ter the item(s) included in the shelf depicted in the input image based on comparison with the reference shelf image, such as a suitable, closest matching reference image, as identified by the reference image identifier 210. For example, the reference image identifier 210 can indicate the identified reference image to the image auditor 230 via a reference identification interface 235. The image auditor 230 retrieves the set of reference items associated with the identified reference shelf image from the reference database 205 via a reference information interface 240. In the illustrated example, the image auditor 230 uses the retrieved set of reference items associated with the identified reference shelf image to automatically audit (e.g., identify and register) one or more of the items in the shelf depicted in the input image obtained via the interface 215. For example, the set of reference items may be represented using item identifiers, item location information, etc., for each item in the reference shelf image. In such an example, the image auditor 230 can initially register particular locations in the input image as being associated with respective reference items at the same locations in the reference shelf image. In some examples, the image auditor 230 can additionally or alternatively modify the initial audit determined automatically for the shelf depicted in the input image based on region(s) of the input image determined to be different from corresponding region(s) of the identified reference image.

Figure 4:
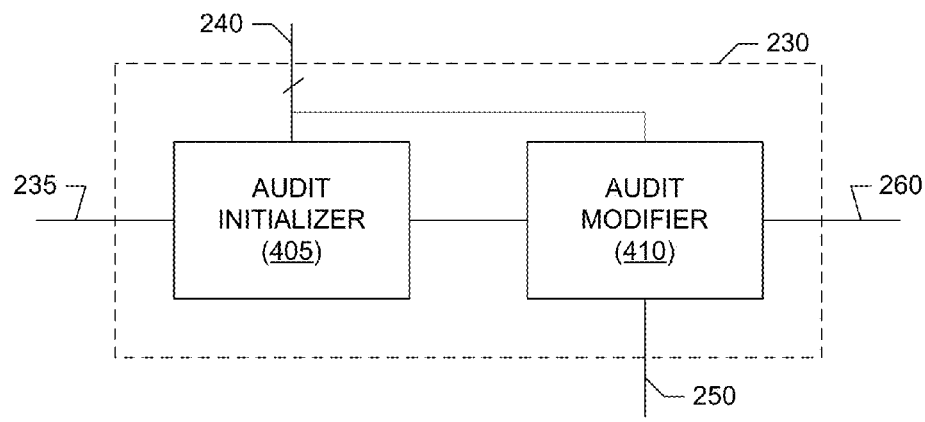
FIG. 4 is a block diagram of an example image auditor that may be used to implement the example image processing system of FIG. 2.
Figure 5:
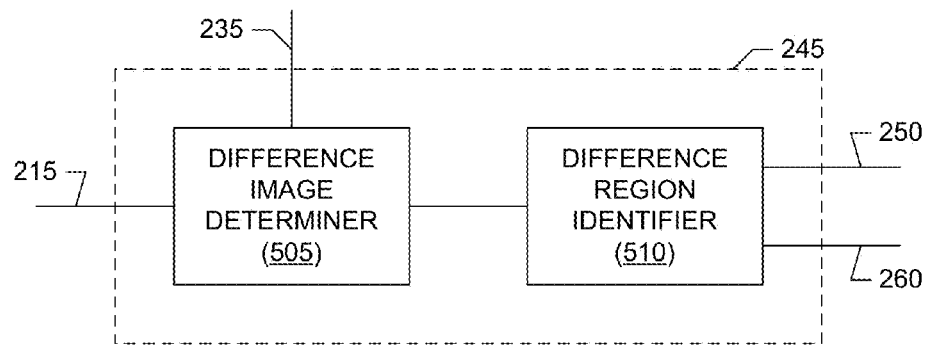
FIG. 5 is a block diagram of an example difference detector that may be used to implement the example image processing system of FIG. 2.

For example, the image processing system 105 of FIG. 2 further includes an example difference determiner 245 to determine region(s) of the input image obtained via the interface 215 that differ from corresponding region(s) of the matching reference image identified by the reference image identifier 210 (e.g., as indicated via the interface 235). Any such region(s) of the input image can be indicated to the image auditor 230 via a difference region interface 250. In the illustrated example, the image auditor 230 can modify the initial, automated audit determined for the shelf depicted in the input image by enabling modification of the identification and registration of the items depicted in the region(s) of the input image indicated by the difference detector 245 as being different from the matching reference image. An example implementation of the image auditor 230 is illustrated in FIG. 4, which is described in greater detail below. An example implementation of the difference determiner 245 is illustrated in FIG. 5, which is described in greater detail below.

To configure operation of one or more of the reference image identifier 210, the image auditor 230 and/or the difference determiner 245, and/or to receive the shelf audit results determined by the image auditor 230, the image processing system 105 of FIG. 2 includes an example workstation 255. The workstation 255 can be implemented by any type of computer, terminal, server, mobile device, smartphone, PDA, etc. Additionally or alternatively, the workstation 255 can be implemented by the example processing system 1100 of FIG. 11, which is described in greater detail below. In the illustrated example, the image processing system 105 includes a workstation interface 260 to interface the workstation 255 with the reference image identifier 210, the image auditor 230 and/or the difference determiner 245. For example, the workstation 255 can communicate with the reference image identifier 210 to configure one or more matching criteria to be satisfied by a reference image identified to be a match (e.g., a closest match, a sufficient match, etc.) to the input image. Additionally or alternatively, the workstation 255 can communicate with the difference determiner 245 to configure one or more difference thresholds for use by the difference determiner 245 to determine region(s) of the input image that differ from respective region(s) of the identified matching reference image. Additionally or alternatively, the workstation 255 can communicate with the image auditor 230 to receive the initialized and/or modified shelf audit for the shelf depicted in the input image. In some examples, the image auditor 230 can also prompt a user of the workstation 255 to modify the audit results for the item(s) depicted in indicated region(s) of the input image that differ from the identified matching reference image.

Figure 6:
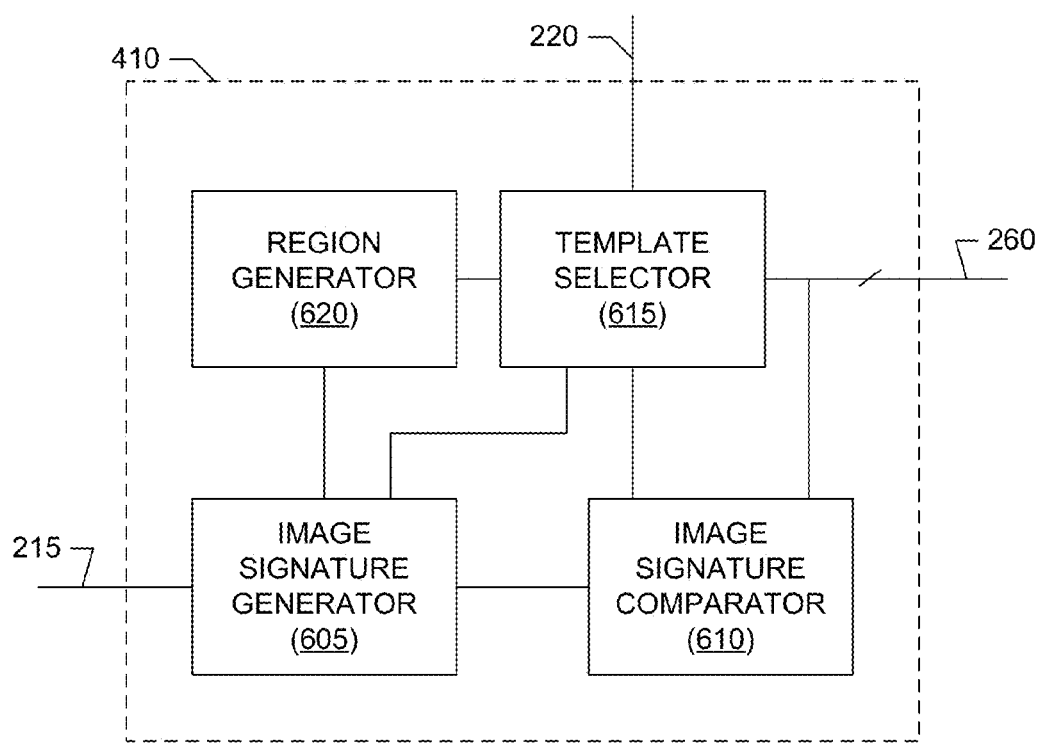
FIG. 6 is a block diagram of an example audit modifier that may be used to implement the example image auditor of FIG. 3.

In some examples, image auditor 230 (e.g., in conjunction with the workstation 255) can obtain an input image depicting one or more groups of items and can automatically identify a number of similar items depicted in the group(s). In such an example, the workstation 255 can be used to select a subregion of the input image to represent an item that is different from what is depicted in a corresponding subregion of the matched reference image. The selected subregion then is used as the template representative of the item, and can be used to obtain the item's ID and to search its neighborhood to find more instances of the item. Furthermore, each instance found, in turn, can become another template for the same item (e.g., to provide multiple templates having different image attributes, such as different tilts, rotations, etc., for the same item), and can be used to start a new searching process. These procedures continue until all items in the input image that are different from those in the matched reference image are associated with correct IDs. As such, the workstation 255 can be used to create a template (e.g., via one or more graphical user interface controls for image processing) from the input image, where the template is selected to depict an instance of one of the items in the shelf depicted in the input image. Additionally or alternatively, the image auditor 230 can use the example image comparison techniques described above to identify a stored template (e.g., reference image) that is a match (e.g., a closest match, a sufficient match, etc.) to a region of the input image and, thus, can be a template for the item depicted in this region of the input image. Given a template for an instance of an item depicted in the input image, the image auditor 230 in such an example can compare the template to other regions of the input image to identify other instances of the same item. An example implementation of such a reference image auditor 230 is illustrated in FIG. 6, which is described in greater detail below.

A block diagram of an example implementation of the reference image identifier 210 of FIG. 2 is illustrated in FIG. 3. The example reference image identifier 210 of FIG. 3 uses image signatures to compare an input image to the set of reference images stored in the reference database 205. In general, an image signature is a proxy determined from one or more characteristics of an image and that is to represent that image. For example, an image signature can be one or more digital values, a waveform, a thumbnail image, a histogram, one or more statistics, one or more characteristics, etc., that can be used to represent a corresponding image. Because image signatures are proxies representing their associated images, the signatures of two images can be compared to determine whether their respective images are substantially similar or identical. Generally, if two image signatures are determined to match (e.g., at least within some tolerance or threshold), then the respective images they represent are substantially similar or identical. Typically, signature comparison is simpler and involves less processing resources than direct image comparison. Further, signature comparison allows comparing images that may be difficult to compare directly, such as images with different sizes, rotations, distortions, etc. In the illustrated example of FIG. 3, the reference image identifier 210 employs image signatures in which two images that are substantially similar except for one or more difference regions (e.g., corresponding to images depicting similar items but with one or more different attributes) will usually have substantially matching signatures (e.g., at least within some tolerance level). Examples of types of image signatures capable of being employed by the reference image identifier 210 include, but are not limited to, the examples described in U.S. Patent Publication No. 2008/0068622, entitled "Methods and Apparatus to Identify Images in Print Advertisements" and published on Mar. 20, 2008, U.S. Publication No. 2006/0153296, entitled "Digital Video Signature Apparatus and Methods for Use with Video Program Identification Systems" and published on Jul. 13, 2006, U.S. Pat. No. 6,633,651, entitled "Method and Apparatus for Recognizing Video Sequences" and issued on Oct. 14, 2003, and U.S. Pat. No. 6,577,346, entitled "Recognizing a Pattern in a Video Segment to Identify the Video Segment" and issued on Jun. 10, 2003. U.S. Patent Publication Nos. 2008/0068622 and 2006/0153296, and U.S. Pat. Nos. 6,633,651 and 6,577,346, are hereby incorporated by reference in their respective entireties.

With the foregoing in mind, the example reference image identifier 210 of FIG. 3 includes an example image signature generator 305 to generate an image signature corresponding to the input image obtained via the interface 215 and depicting a shelf to be audited. For example, the image signature generator 305 can process the input image according to one or more of the example techniques listed above to generate an image signature representative of the input image. The image signature generated by the image signature generator 305 for the input image is referred to herein as the input image signature.

The example reference image identifier 210 of FIG. 3 also includes an example image signature comparator 310 to compare the input image signature determined by the image signature generator 305 for the input image to a set of reference image signatures corresponding to the set of reference images stored in the reference database 205. (For example, the reference image signatures may correspond to the input image signatures obtained from input images during previous auditing, which have been included as reference data stored in the reference database 205.) In some examples, the reference image signatures are pre-computed and stored in the reference database 205 (e.g., for retrieval via the interface 220). Additionally or alternatively, the image signature generator 305 can generate one or more of the reference image signatures for a respective one or more of the reference images.

In the illustrated example, the image signature comparator 310 determines the reference image signature that is a closest match to the input image signature. The reference image corresponding to this reference image signature is then identified by the reference image identifier 210 to be the reference image that is a closest match to the input image. In some examples, the image signature comparator 310 correlates the input image signature with the set of reference image signatures and identifies the reference image signature associated with the largest correlation value as being the closest matching reference signature. Additionally or alternatively, in some examples, the image signature comparator 310 determines a distance between the input image signature and each reference image signature and identifies the reference image signature associated with the minimum distance as being the closest matching reference signature. Any other technique for comparing signatures can additionally or alternatively be used by the image signature comparator 310. In some examples, if more than one reference image are identified as a closest match to the input image, the image signature comparator 310 can generate a prompt to, for example, the workstation 255 to enable a user to select one of the identified reference images for use in subsequent processing.

The example image signature comparator 310 can also be configured (e.g., via the interface 260) with one or more matching criteria that are to be satisfied by a reference image signature (and/or reference image) in order for that reference image to be identified as a closest match to the input image. One example matching criterion could correspond to a minimum correlation value that is to be met or exceeded by correlation of the closest matching reference image signature with the input image signature in order for the image signature comparator 310 to indicate that a match has indeed been found. Another example matching criterion could correspond to a maximum distance between the closest matching reference image signature with the input image signature that is not to be met or exceeded in order for the image signature comparator 310 to indicate that a match has indeed been found. In some examples, if the one or more matching criteria are satisfied, the reference image identifier 210 indicates (e.g., via the interface 235) the identified reference image corresponding to the closest matching reference image signature as determined by the image signature comparator 310. However, if the matching criterion or criteria are not satisfied, then the reference image identifier 210 indicates that no match for the input image was identified.

A block diagram of an example implementation of the image auditor 230 of FIG. 2 is illustrated in FIG. 4. The example image auditor 230 of FIG. 4 includes an example audit initializer 405 to initialize an audit of a shelf depicted in an input shelf image. In the illustrated example, the audit initializer 405 initializes the audit of an input shelf image by obtaining a reference shelf image that has been identified (e.g., as via the interface 235) or selected by a user (e.g., from a set of possible matching images identified via the interface 235) to be a match to the input shelf image. The audit initializer 405 then automatically registers one or more regions (e.g., specified by location, region, etc.) of the input shelf image as corresponding to the respective reference item(s) associated with these similar region(s) of a matching reference shelf image. The audit initializer 405 can retrieve the set of reference items associated with this identified reference image (including information specifying the location, shape, etc., of each of these reference items) from the reference database 205 (e.g., via the interface 240).

For example, assume that a reference shelf image identified as matching the input image is associated with a set of ten (10) reference items. Each reference item in the set is represented, using any appropriate data representation, by an identifier, a region location specifying where the reference item is located in the reference shelf image, and a region shape specifying a shape of the reference item in the reference shelf image. In such an example, the audit initializer 405 automatically determines an initial audit result for the shelf depicted in the input shelf image. The initial audit identifies the same 10 items as in the set of reference items, and registers these items as being located in the input shelf image at same locations and with the same shapes as in the reference shelf image.

The example image auditor 230 of FIG. 4 also includes an example audit modifier 410 to modify the initial audit determined automatically by the audit initializer 405 for the input shelf image. As described above, in some examples, the input image and the matching reference image may differ in one or more image regions. These difference regions may correspond to one or more items that differ between the shelf depicted in the input image and the reference shelf depicted in the matching reference image. In the illustrated example, the audit modifier 405 receives (e.g., via the interface 250) an indication of any region(s) that differ between the input and reference images. If there are any indicated difference region(s), the audit modifier 410 can be used to help replace the initial audit determined by the audit initializer 405 for the shelf depicted in the input image with correct ID association based on the item(s) depicted in the indicated difference region(s) of the input image. In some example, the audit modifier 410 can also be used for modify (e.g., override) the audit of items in regions that are regarded as the same.

For example, assume that the shelf depicted in the depicted in the input image includes 10 items in which 8 of the items are the same as in the identified matching reference shelf image, but 2 of the items have changed. In such an example, the difference region(s) between the input image and the matching reference image may correspond to region(s) of the input image depicting the 2 items that have changed. Let us refer the first such item as Ia, the second, Ib, and their corresponding regions, Ra and Rb, respectively. In such an example, the audit modifier 410 may highlight both regions Ra and Rb and enable an analyst to mark any of Ra or Rb. If the analyst marks Ra, then the audit modifier 410 will use Ra as a template to acquire an ID for Ia, and to check if Ra and Rb depict the same item. Once an ID is acquired for Ia, the ID will be assigned to Ra, and also Rb if the audit modifier 410 determines that Ia and Ib are the same kind of item. Otherwise, the audit modifier 410 will repeat the acquisition procedure to obtain an ID for Ib and assign the ID to Rb. Once all ID assignments are complete, the shelf depicted in the input image is audited. The audit result is also used to update the database 205, in addition to being reported (e.g., via the workstation interface 260).

The audit modifier 410 of the illustrated example can use any appropriate technique or techniques to cause the modification of the initial shelf audit based on difference region(s) identified between the input shelf image and the reference shelf image. For example, the audit modifier 410 could prompt a user of the workstation 255 (e.g., via the interface 260) to enter item identification information, item location information, item shape information, etc., for the item(s) depicted in the identified difference region(s) between the input and matching reference images. For example, the audit modifier 410 could cause a version of the input image to be displayed on the workstation 255 with the difference region(s) being highlighted or otherwise indicated in the display. The audit modifier 410 could then cause the workstation 255 to prompt the user to modify the initial audit for the displayed input shelf based on the item(s) depicted in the highlighted or otherwise indicated region(s) of the displayed image.

Additionally, in some example, the audit modifier 410 enables a user to create an item template corresponding to one of the items depicted in a difference region. For example, the audit modifier 410 causes graphical user interface (GUI) to be implemented by the workstation 255 via which the user can graphically create a template representative of an item depicted in a difference region. Example GUI-based techniques that can be employed by the audit modifier 410 to enable graphical creation of item templates are described in U.S. Patent Publication No. 2009/0123069, entitled "Methods and Apparatus to Specify Regions of Interest in Video Frames," and published on May 14, 2009, which is hereby incorporated by reference in its entirety The audit modifier 410 can then use the template to automatically detect other instances of the respective item in the difference region (e.g., in a neighborhood near the item corresponding to the reference template). A block diagram of an example implementation of the audit modifier 410 is illustrated in FIG. 6.

A block diagram of an example implementation of the difference determiner 245 of FIG. 2 is illustrated in FIG. 5. As noted above, the reference image identified by the reference image identifier 210 as being a match (e.g., a closest match, a substantial match, etc.) to the input image depicting the shelf to be audited may have one or more regions that differ from the input image. The difference determiner 245 determines any such difference region(s) corresponding to region(s) of the input shelf image (e.g., obtained via the interface 215) that differ from corresponding region(s) of the matching reference shelf image (e.g., as indicated via the interface 235). Any technique for determining differences between images, or combination of such techniques, may be implemented by the difference determiner 245. For example, the difference determiner 245 may compare respective pixels or blocks of pixels, and/or the signatures of respective blocks of pixels, in the input and identified reference images to determine any difference regions therebetween. Other example techniques for determining differences between images that can be employed by the difference determiner 245 include, but are not limited to, the examples described in U.S. application Ser. No. 12/754,361, entitled "Method and Apparatus to Detect Differences Between Images" and filed on Apr. 5, 2010, which was published as U.S. Patent Publication No. 2011/0243459 on Oct. 6, 2011. U.S. application Ser. No. 12/754,361 (U.S. Patent Publication No. 2011/0243459) is hereby incorporated by reference in its entirety.

With the foregoing in mind, the example difference determiner 245 of FIG. 5 includes an example difference image determiner 505 to determine a difference image representing differences between pixels of the input image (e.g., obtained via the interface 215) and respective pixels of the closest matching reference image (e.g., as indicated via the interface 235) (and/or between signatures for respective blocks of pixels of the input and matching reference images). For example, the difference image determiner 505 can perform one or more image registration operations to cause the input image to coincide with the identified, closest matching reference image (e.g., in terms of size, shape, spatial orientation, etc.). Examples of image registration operations that can be performed by the difference image determiner 505 include, but are not limited to, one or more of image scaling, image rotation, image deskewing, etc. The difference image determiner 505 can then determine the difference image to include pixels formed by subtracting, dividing, etc., pixels in the input image (after registration) by respective pixels (e.g., at the same locations) in the closest matching reference image, or vice versa. The difference image determiner 505 also can determine the difference image at a block/patch level by using a maximum correlation of each block/patch in the input image among blocks/patches formed in a neighborhood of the corresponding input block/patch such that the pixels in the input block are set to a first value (e.g., 0) if the maximum correlation is less than some predetermined threshold, or are set to a second value (e.g., 1) otherwise.

The example difference determiner 245 of FIG. 5 also includes an example difference region identifier 510 to process the difference image determined by the difference image identifier 505 to determine the region(s), if any, indicated by the difference image. For example, pixels of the input image that are the same (or substantially the same) as respective pixels of the matching reference image will yield pixels in the difference image forming a common background shade/color (such as pixels corresponding to a value of 0 for difference pixels determined using subtraction, or pixels corresponding to a value of 1 for difference pixels determined using division, etc.). However, groups of pixels in the input image that are the different from respective groups of pixels in the matching reference image will yield regions in the difference image that differ in appearance, from the background. Thus, the difference region identifier 510 identifies groups, or neighborhoods, of pixels in the difference image that differ from the background of the difference image. The locations and shapes of these identified groups, or neighborhoods, of pixels are output (e.g., via the interface 250) by the difference region identifier 510 as the difference region(s), if any, between the input image and the closest matching reference image.

In some examples, the difference region identifier 510 is configured (e.g., via the interface 260) with one or more difference thresholds. The difference threshold(s) are used by the difference region identifier 510 to determine whether a group, or neighborhood, of pixels in the difference image (or a signature for this group) differs enough from the background to be considered a difference region. For example, the difference region identifier 510 can determine that a group, or neighborhood, of pixels in the difference image corresponds to a difference region between the input image and the closest matching reference image if the group, or neighborhood, of pixels meet or exceed a difference threshold above the background of the difference image. In some examples, another difference threshold may specify a threshold percentage, number, etc., of pixels in the group, or neighborhood, that are to meet or exceed a difference threshold above the background of the difference image in order for the group, or neighborhood, to be considered to be a difference region between the input image and the closest matching reference image.

A block diagram of an example implementation of the audit modifier 410 of FIG. 4 is illustrated in FIG. 6. The audit modifier 410 includes an example image signature generator 605 and an example image signature comparator 610 that may be similar or identical to the image signature generator 305 and the image signature comparator 310 of the reference image identifier 210 of FIG. 2. As such, the detailed descriptions of the image signature generator 605 and the image signature comparator 610 correspond to the detailed descriptions of the image signature generator 305 and the image signature comparator 310 provided above in connection with the discussion of FIG. 3 and, in the interest of brevity, are not repeated in the discussion of FIG. 6.

In addition to the image signature generator 605 and the image signature comparator 610, the example audit modifier 410 of FIG. 6 includes an example template selector 615 and an example region generator 620. The template selector 615 and the region generator 620 are included in the illustrated example of FIG. 6 to enable the audit modifier 410 to identify multiple instances of a same item in a difference region between the input shelf image and the matching reference shelf image. The template selector 615 permits creation or selection of a template image (also referred to a template, an item template, etc.) corresponding to an instance of an item that is present in the input image (e.g., and not present in the reference image) by a user of the workstation 255 via a graphic user interface.

The audit modifier 410 includes the region generator 620 to select subregion(s) of the difference region to be compared with the template selected by the template selector 615. The difference region subregion selected by the region generator 620 is compared to the template selected by the template selector 615 using, for example, the image signature generator 605 and the image signature comparator 610, as described above. For example, the region generator 620 can use sliding regions, a grid pattern, etc. (e.g., that exploit redundancies, such as the fact that similar items are usually displayed in groups on the shelves being audited), to successively select subregions of the difference region for comparison with the selected template. In the illustrated example, a selected subregion of the difference region of the input image is provided or otherwise indicated to the image signature generator 605, which generates an image signature of the selected subregion. The image signature comparator 310 then compares the generated image signature for the subregion with the image signature for the template (e.g., also considering any matching criteria, if configured) to determine whether the template sufficiently matches the selected subregion. If a sufficient match is detected, the image signature comparator 610 can indicate that the selected subregion in the input image corresponds to another instance of the item represented by the template. In some examples, once an instance is detected by the image signature comparator 610, its presence in the input image is masked out, and the detected instance becomes a new template for repeating the above process, thereby creating a set of templates for the same item (e.g., to provide multiple templates having different image attributes, such as different tilts, rotations, etc., for the same item). Once the auditing is finished, the auditing results along with the region signature(s) are added to the reference database 205.

While an example manner of implementing the image processing system 105 of FIG. 1 has been illustrated in FIGS. 2-6, one or more of the elements, processes and/or devices illustrated in FIGS. 2-6 may be combined, divided, re-arranged, omitted, eliminated and/or implemented in any other way. Further, the example reference database 205, the example reference image identifier 210, the example image auditor 230, the example difference determiner 245, the example workstation 255, the example image signature generator 305, the example image signature comparator 310, the example audit initializer 405, the example audit modifier 410, the example difference image determiner 505, the example difference region identifier 510, the example audit modifier 410, the example image generator 605, the example image signature comparator 610, the example template selector 615, the example region generator 620 and/or, more generally, the example image processing system 105 of FIGS. 2-6 may be implemented by hardware, software, firmware and/or any combination of hardware, software and/or firmware. Thus, for example, any of the example reference database 205, the example reference image identifier 210, the example image auditor 230, the example difference determiner 245, the example workstation 255, the example image signature generator 305, the example image signature comparator 310, the example audit initializer 405, the example audit modifier 410, the example difference image determiner 505, the example difference region identifier 510, the example audit modifier 410, the example image generator 605, the example image signature comparator 610, the example template selector 615, the example region generator 620 and/or, more generally, the example image processing system 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example image processing system 105, the example reference database 205, the example reference image identifier 210, the example image auditor 230, the example difference determiner 245, the example workstation 255, the example image signature generator 305, the example image signature comparator 310, the example audit initializer 405, the example audit modifier 410, the example difference image determiner 505, the example difference region identifier 510, the example audit modifier 410, the example image generator 605, the example image signature comparator 610, the example template selector 615 and/or the example region generator 620 are hereby expressly defined to include a tangible computer readable medium such as a memory, a memory card, digital versatile disk (DVD), compact disk (CD), etc., storing such software and/or firmware. Further still, the example image processing system 105 of FIGS. 2-6 may include one or more elements, processes and/or devices in addition to, or instead of, those illustrated in FIGS. 2-6, and/or may include more than one of any or all of the illustrated elements, processes and devices.

Flowcharts representative of example machine readable instructions that may be executed to implement the example image processing system 105, the example reference database 205, the example reference image identifier 210, the example image auditor 230, the example difference determiner 245, the example workstation 255, the example image signature generator 305, the example image signature comparator 310, the example audit initializer 405, the example audit modifier 410, the example difference image determiner 505, the example difference region identifier 510, the example audit modifier 410, the example image generator 605, the example image signature comparator 610, the example template selector 615 and/or the example region generator 620 are shown in FIGS. 7-10. In these examples, the machine readable instructions represented by each flowchart may comprise one or more programs for execution by a processor, such as the processor 1112 shown in the example processing system 1100 discussed below in connection with FIG. 11. Alternatively, the entire program or programs and/or portions thereof implementing one or more of the processes represented by the flowcharts of FIGS. 7-10 could be executed by a device other than the processor 1112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 7-10 may be implemented manually. Further, although the example machine readable instructions are described with reference to the flowcharts illustrated in FIGS. 7-10, many other techniques for implementing the example methods and apparatus described herein may alternatively be used. For example, with reference to the flowcharts illustrated in FIGS. 7-10, the order of execution of the blocks may be changed, and/or some of the blocks described may be changed, eliminated, combined and/or subdivided into multiple blocks.

As mentioned above, the example processes of FIGS. 7-10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 7-10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 7:
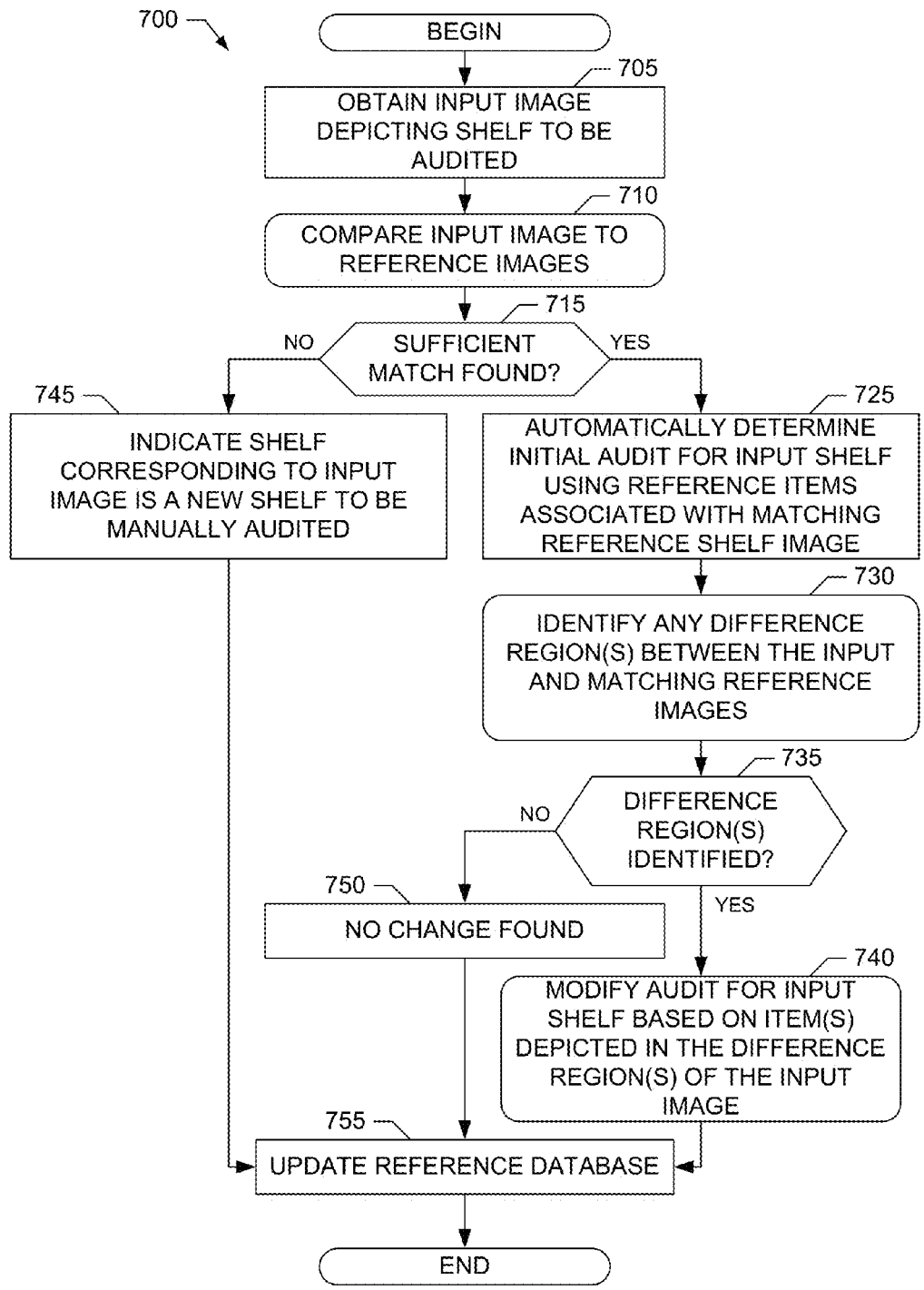
FIG. 7 is a flowchart representative of example machine readable instructions that may be executed to implement the example image processing system of FIG. 2.
Figure 8:
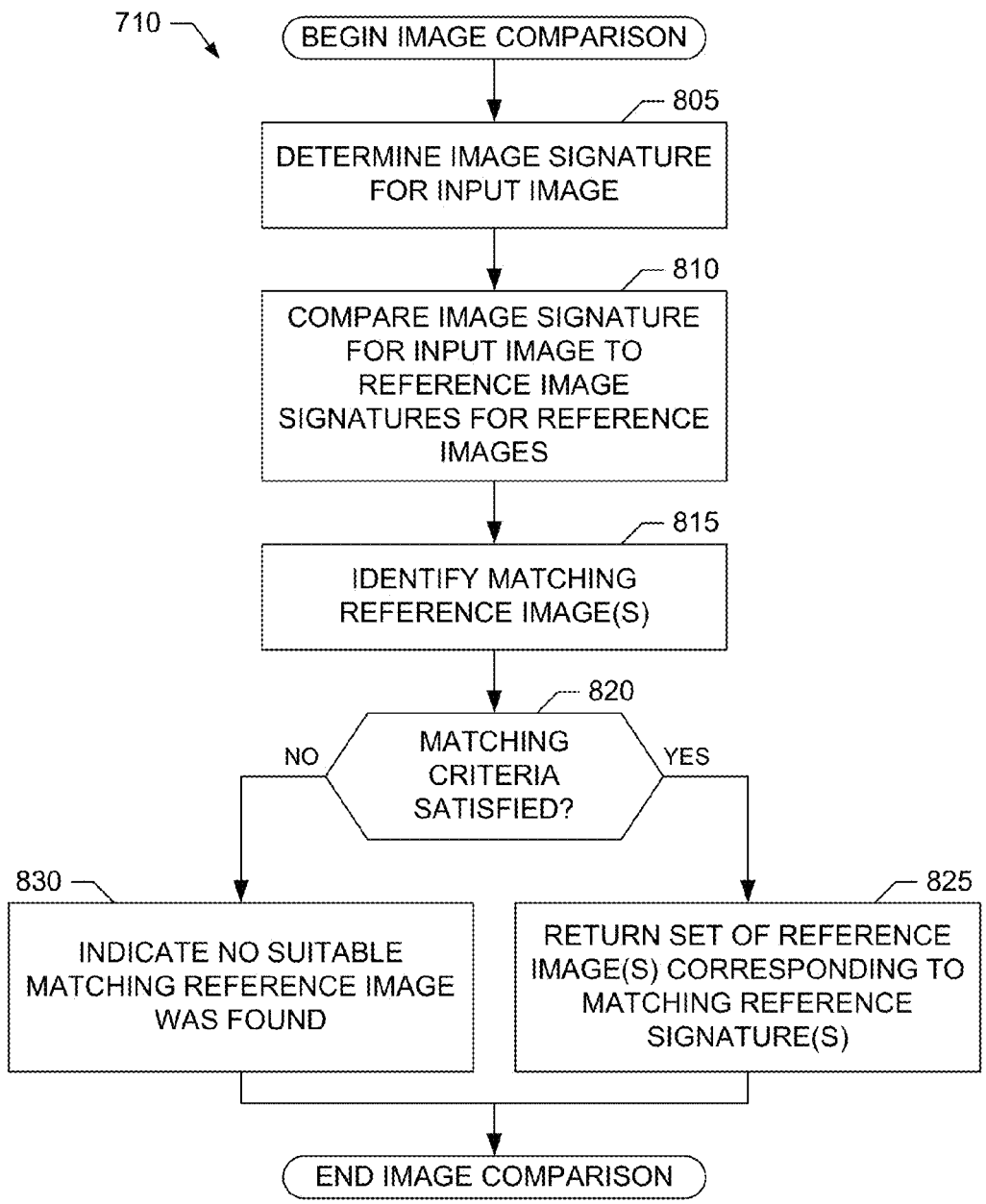
FIG. 8 is a flowchart representative of example machine readable instructions that may be executed to implement the example reference image identifier of FIG. 3 and/or the example machine readable instructions of FIG. 7.

Example machine readable instructions 700 that may be executed to implement the image processing system 105 illustrated in the preceding figures are represented by the flowchart shown in FIG. 7. With reference to the preceding figures, the machine readable instructions 700 of FIG. 7 begin execution at block 705 at which the image processing system 105 obtains an input image depicting a shelf to be audited. For example, the input image may be obtained from the imaging device 125, as described above. At block 710, the reference image identifier 210 of the image processing system 105 compares the input shelf image to a set of reference shelf images stored in, for example, the reference database 205. As described above, the set of reference images depicts a respective set of reference shelves that have already been audited, and the reference image identifier 210 compares the input image to the set of reference images stored to identify a set of matching reference images that satisfies one or more matching criteria. Example machine readable instructions that may be used to implement the processing at block 710 are illustrated in FIG. 8, which is described in greater detail below.

Figure 9:
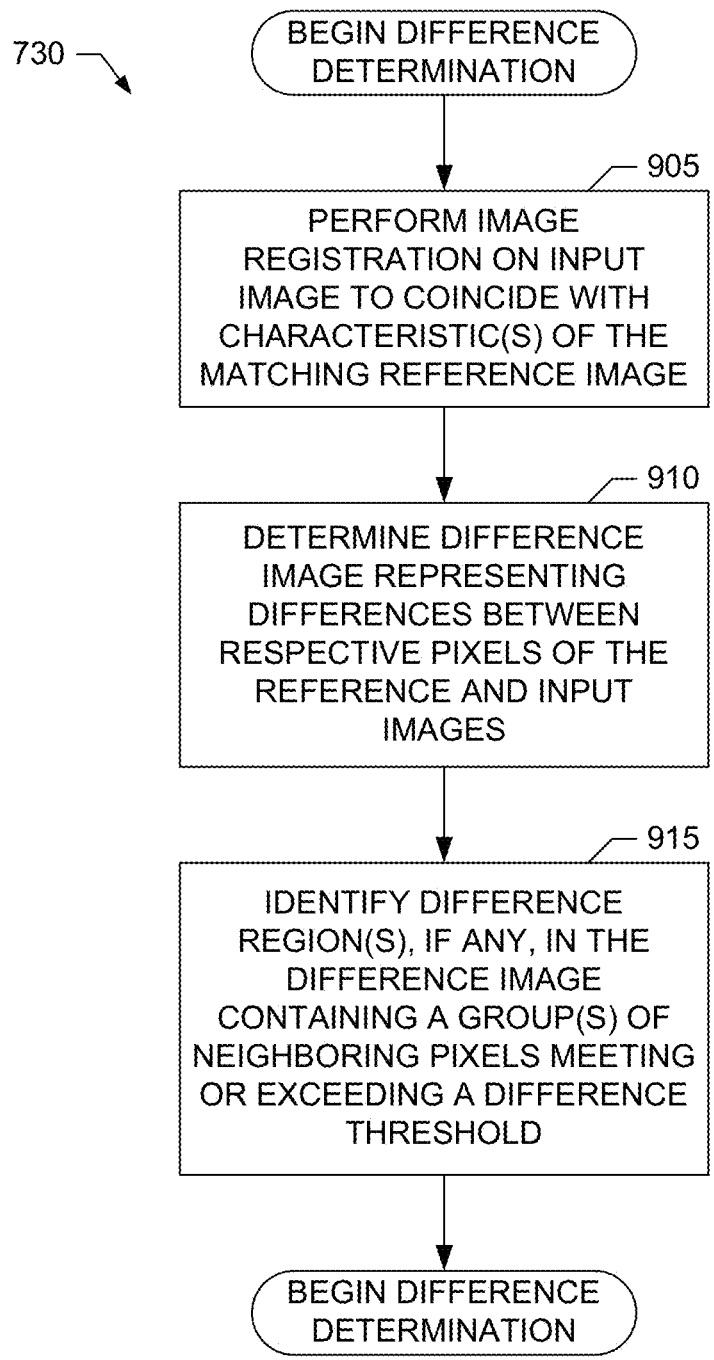
FIG. 9 is a flowchart representative of example machine readable instructions that may be executed to implement the example difference detector of FIG. 5 and/or the example machine readable instructions of FIG. 7.

At block 715, the reference image identifier 210 determines whether a reference image that sufficiently matches the input image (e.g., is the closest matching reference image and satisfies the one or more matching criteria) has been found. If a sufficient match has been found (block 715), then at block 725 the image auditor 230 of the image processing system 105 will select the best one among the set automatically if feasible, or ask the user to select the best one, otherwise. The image auditor 230 then automatically determines, as described above, an initial audit result for the shelf depicted in the input image using a set of reference items associated with the reference image obtained previously. At block 730, the difference determiner 245 of the image processing system 105 determines, as described above, any difference region(s) between the input image and the matching reference image identified at block 710 and obtained previously. Example machine readable instructions that may be used to implement the processing at block 730 are illustrated in FIG. 9, which is described in greater detail below.

At block 735, the image auditor 230 determines whether the difference determiner 245 identified any difference region(s) between the input image and the selected matching reference image. As discussed above, the difference region(s), if any, correspond to region(s) of the input image that differ from respective region(s) of the matching reference image and, thus, can depict items(s) that differ between the input shelf image and the selected matching reference shelf image. As such, if the difference determiner 245 identified any difference region(s) (block 735), then at block 740 the image auditor 230 modifies, as described above, the audit result previously determined at block 725 for the shelf depicted in the input image based on the items(s) depicted in the identified difference region(s) of the input image. Otherwise, the image auditor 230 can indicate at block 750 that no differences between the images were found. Execution of the example machine readable instructions 700 then ends.

However, if at block 715 the reference image identifier 210 determines that a sufficient match has not been found, such as when the closest matching reference image does not satisfy at least one of the matching criteria, processing proceeds to block 745 instead of block 720. At block 745, the reference image identifier 210 indicates that no reference image sufficiently matching the input image was found. This, in turn, can cause the image auditor 230 and, thus, the image processing system 105 to indicate that the shelf depicted in the input image is a new shelf for which automated auditing was unsuccessful, and the shelf audit for the shelf depicted in the input image is performed manually. In some examples, control proceeds from block 745 to block 740 where the whole image is highlighted as one difference region, thereby enabling the template processing techniques described above to be used to code repeated instances of the same item only once. When auditing is finished and the processing at blocks 730, 740 or 745 has completed, the results are also used at block 755 to update the reference database 205 (e.g., to form a new reference image from the input image that was audited).

Example machine readable instructions 710 that may be executed to implement the reference image identifier 210 of FIGS. 2 and/or 3, and/or to perform the processing at block 710 of FIG. 7, are represented by the flowchart shown in FIG. 8. With reference to the preceding figures, the machine readable instructions 710 of FIG. 8 begin execution at block 805 at which the image signature generator 305 of the reference image identifier 210 determines, as described above, an input image signature representative of the input image. At block 810, the image signature comparator 310 of the reference image identifier 210 compares, as described above, the input image signature to a set of reference image signatures associated respectively with the set of reference images stored in the reference database 205. At block 815, the image signature comparator 310 identifies, as described above, a set of one or more reference images having reference signature(s) determined to match the input image signature. In some examples, at block 815, the image signature comparator 310 records each reference image that is considered to match the input image along with its matching scores.

Next, at block 820 the image signature comparator 310 determines whether the matching reference image signature(s) for the set of one or more matching reference images satisfy one or more matching criteria (e.g., such as a minimum correlation value, a maximum distance, etc.), as described above. If the matching reference image signature(s) satisfy the one or more matching criteria (block 820), then at block 825 the reference image identifier 210 returns the set of one or more matching reference image(s) corresponding to the matching reference image signature(s) and identifies these reference image(s) as being the closest match to the input image. However, if the matching reference image signature(s) fail to satisfy one or more of the matching criteria (block 820), then at block 830 the reference image identifier 210 indicates that no reference image that suitably matches the input image was found. In some examples, user selection of the best among the matching reference images can also be performed at block 820. In such an example, if there is a selection, then control goes to block 825; otherwise control proceeds to block 830.

Example machine readable instructions 730 that may be executed to implement the difference determiner 245 of FIGS. 2 and/or 5, and/or to perform the processing at block 730 of FIG. 7, are represented by the flowchart shown in FIG. 9. With reference to the preceding figures, the machine readable instructions 730 of FIG. 9 begin execution at block 905 at which the difference image determiner 505 of the difference determiner 245 performs image registration, as described above, on the input image depicting the shelf to be audited. Image registration is performed at block 905 to cause the input image to coincide with the identified, closest matching reference image in terms of, for example, size, shape, spatial orientation, etc. At block 910, the difference image determiner 505 determines, as described above, a difference image representing, for example, the differences between pixels of the input image (e.g., after registration) and respective pixels of the closest matching reference image. At block 915, the difference region identifier 510 of the difference determiner 245 identifies, as described above, any difference region(s) in the difference image that represent region(s) of the input image that differ from corresponding region(s) of the closest matching reference image. For example, and as describe above, the difference region(s), if any, in the difference image can correspond to neighborhood(s) of pixels that differ from the difference image's background by one or more difference thresholds.

Figure 10:
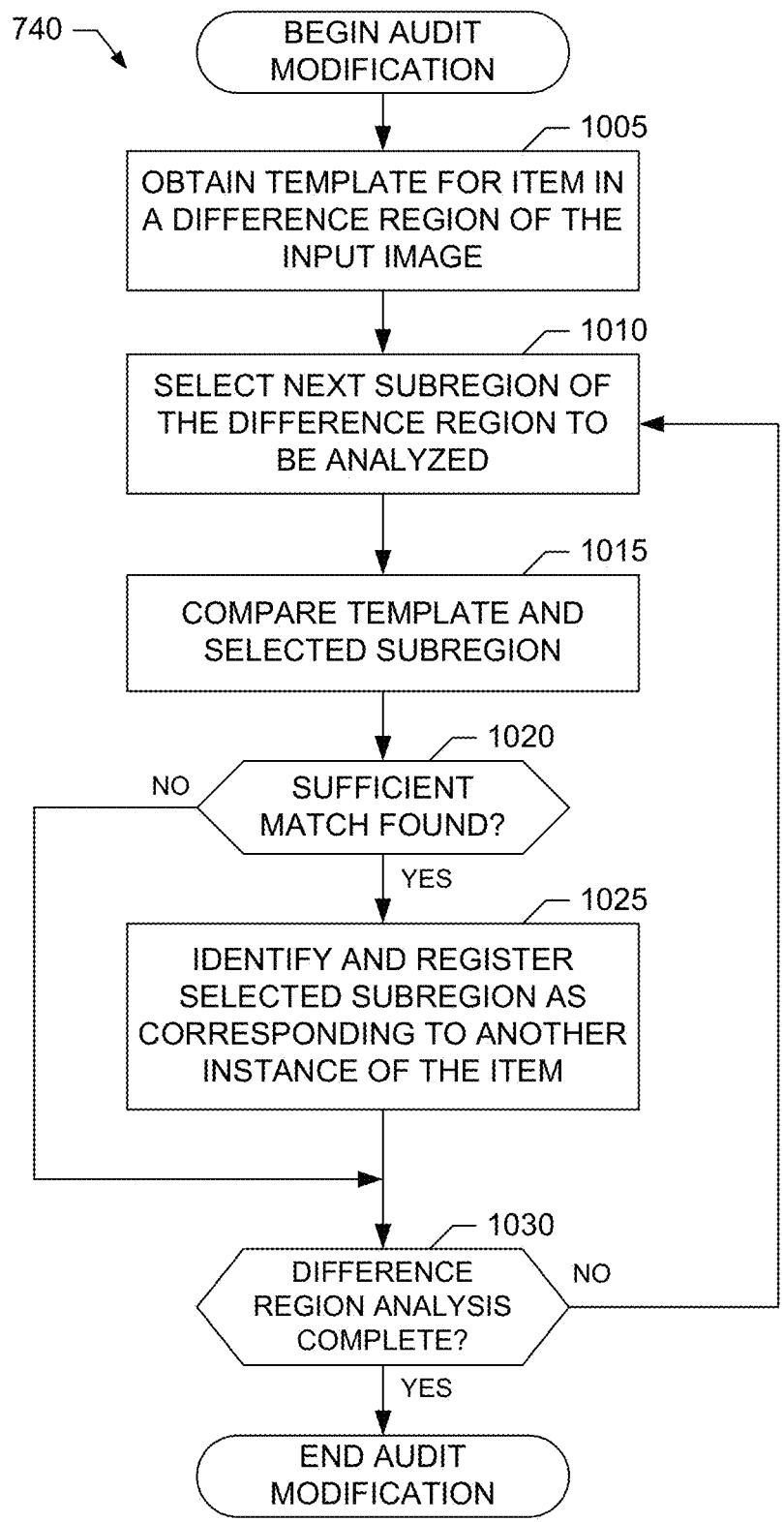
FIG. 10 is a flowchart representative of example machine readable instructions that may be executed to implement the example image auditor of FIG. 3, the example audit modifier of FIG. 6 and/or the example machine readable instructions of FIG. 7.

Example machine readable instructions 740 that may be executed to implement the audit modifier 410 of FIG. 6, and/or to perform the processing at block 7440 of FIG. 7, are represented by the flowchart shown in FIG. 10. With reference to the preceding figures, the machine readable instructions 740 of FIG. 10 begin execution at block 1005 at which the template selector 615 of the audit modifier 410 obtains, as described above, a template for an item to be identified in a difference region of an input image. At block 1010, the region generator 620 of the audit modifier 410 selects, as described above, a next subregion of the difference region to be analyzed. At block 1015, the audit modifier 410 compares the template selected at block 1005 with the subregion of the difference region selected at block 1015. For example, and as described above, the audit modifier 410 can use its image signature generator 605 to generate a subregion image signature of the selected subregion and a template signature of the template image, and then use its image signature comparator 610 to compare the subregion image signature with the template signature.

At block 1020, if the template is determined to sufficiently match the selected subregion of the difference region of the input image (e.g., by satisfying one or more matching criteria), the subregion of the input image is masked out, and at block 1025 the audit modifier 410 indicates, as described above, that the selected subregion corresponds to another instance of the reference item corresponding to the template. At block 1030, the audit modifier 410 determines whether analysis of the difference region of the input image is complete (e.g., such as after all subregions of the difference region have been analyzed). If analysis of the difference region is not complete (block 1030), then processing returns to block 1010 and blocks subsequent thereto to enable the audit modifier 410 to compare the template (and/or a new template created from the previously matched instance in the input image) with another selected subregion of the difference region of the input image (e.g., such as a region overlapping, adjacent to or in the neighborhood of the previously processed subregion).

Figure 11:
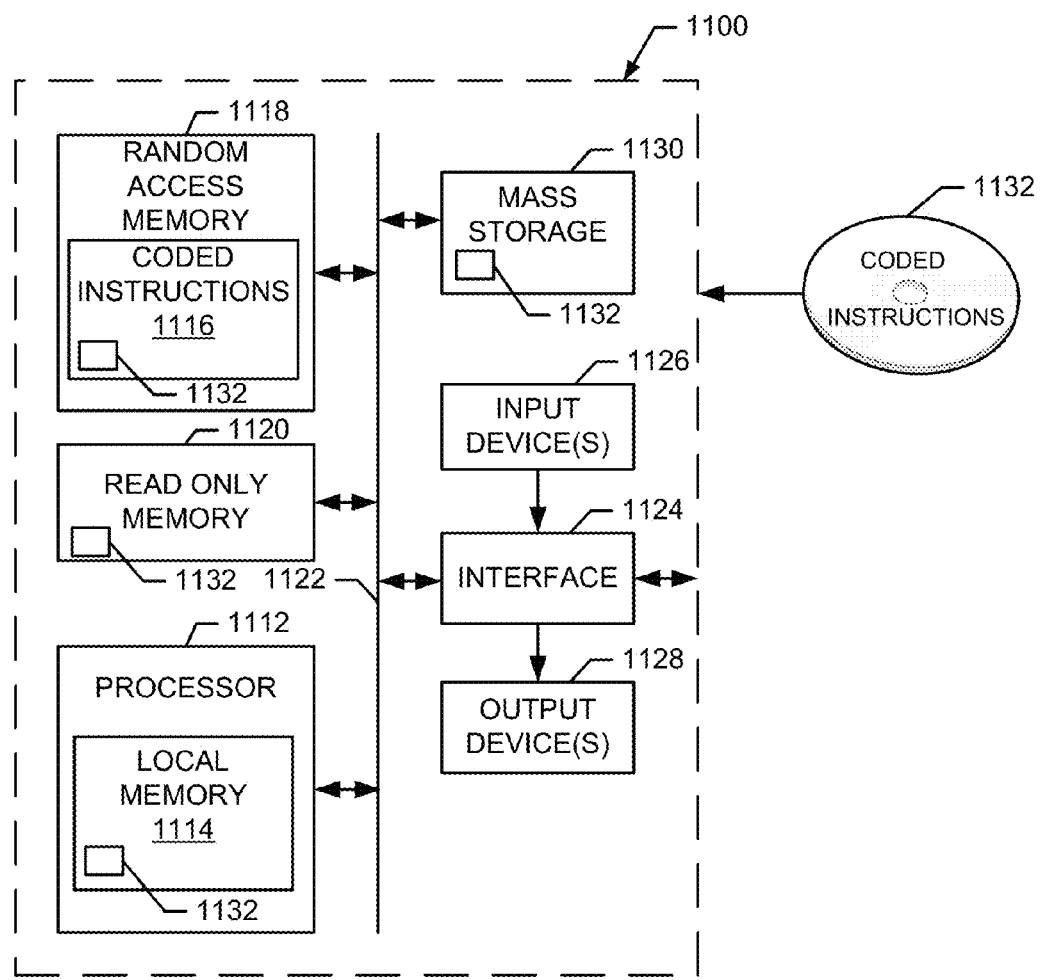
FIG. 11 is a block diagram of an example processing system that may execute the example machine readable instructions of FIGS. 7-9 and/or 10 to implement the example image processing system of FIG. 2, the example reference image identifier of FIG. 3, the example image auditor of FIG. 4, the example difference detector of FIG. 5 and/or the example audit modifier of FIG. 6.

FIG. 11 is a block diagram of an example processing system 1100 capable of implementing the apparatus and methods disclosed herein. The processing system 1100 can be, for example, a server, a personal computer, tablet computer, a smartphone, a personal digital assistant (PDA), an Internet appliance, or any other type of computing device.

The system 1100 of the instant example includes a processor 1112 such as a general purpose programmable processor. The processor 1112 includes a local memory 1114, and executes coded instructions 1116 present in the local memory 1114 and/or in another memory device. The processor 1112 may execute, among other things, the machine readable instructions represented in FIGS. 7-10. The processor 1112 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The processing system 1100 also includes an interface circuit 1124. The interface circuit 1124 may be implemented by any type of interface standard, such as an Ethernet interface, a universal serial bus (USB), and/or a third generation input/output (3GIO) interface.

One or more input devices 1126 are connected to the interface circuit 1124. The input device(s) 1126 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, WiFi, etc.).

The processing system 1100 also includes one or more mass storage devices 1130 for storing machine readable instructions and data. Examples of such mass storage devices 1130 include floppy disk drives, hard drive disks, compact disk drives and digital versatile disk (DVD) drives. In some examples, the mass storage device 1130 may implement the reference database 205. Additionally or alternatively, in some examples the volatile memory 1118 may implement the reference database 205.

The coded instructions 1132 of FIGS. 7-10 may be stored in the mass storage device 1130, in the volatile memory 1118, in the non-volatile memory 1120, in the local memory 1114 and/or on a removable storage medium, such as a CD or DVD 1132.

As an alternative to implementing the methods and/or apparatus described herein in a system such as the processing system of FIG. 11, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for shelf auditing, the method comprising:
   comparing, with a processor, an input image depicting a shelf to be audited with a set of reference images depicting reference shelves displaying respective sets of reference items;
   identifying, with the processor, a first reference image from the set of reference images that has been determined to match the input image;
   determining, with the processor, an initial audit result for the shelf depicted in the input image based on a first set of reference items associated with the first reference image;
   determining, with the processor a first region of the input image that differs from a corresponding first region of the first reference image; and
   modifying, with the processor, the initial audit result for the shelf depicted in the input image based on an item depicted in the first region of the input image.

2. A method as defined in claim 1 wherein determining the initial audit result for the shelf depicted in the input image is performed if a comparison of the input image and the first reference image satisfies a matching criterion, and further comprising, if the comparison does not satisfy the matching criterion, indicating that the shelf is a new shelf for which determination of the initial audit result was unsuccessful.

3. A method as defined in claim 1 wherein the set of reference images is associated with a respective set of reference image signatures, and further comprising:
   determining an input image signature for the input image;
   comparing the input image signature to the set of reference image signatures; and
   determining that the first reference image matches the input image when a first reference image signature associated with the first reference image is determined to match the input image signature.

4. A method as defined in claim 3 wherein the input image signature comprises an input image histogram, and the set of reference image signatures comprises a set of reference image histograms.

5. A method as defined in claim 3 the first reference image signature is determined to match the input image signature when the first reference image signature and the input image signature have at least one of a minimum distance or a maximum correlation value relative to the other reference image signatures in the set of reference image signatures.

6. A method as defined in claim 1 wherein modifying the initial audit result comprises:
   identifying the item depicted in the first region of the input image; and
   registering the item as being associated with the shelf depicted in the input image.

7. A method as defined in claim 1 further comprising:
   determining a second region of the input image that differs from a corresponding second region of the first reference image; and
   further modifying the initial audit result for the shelf depicted in the input image based on a second item depicted in the second region of the input image.

8. A method as defined in claim 1 wherein determining the first region of the input image that differs from the corresponding first region of the first reference image comprises:
   determining a difference image representing differences between pixels of the input image and respective pixels of the first reference image; and
   determining the first region of the input image to correspond to a first region of the difference image in which a neighborhood of pixels meets or exceeds a difference threshold.

9. A method as defined in claim 1 further comprising processing the first region of the input image with a template representative of the item to identify another instance of the item in the first region of the input image.

10. A tangible machine readable medium comprising machine readable instructions which, when executed, cause a machine to at least:
    compare an input image depicting a shelf to be audited with a set of reference images depicting reference shelves displaying respective sets of reference items;
    identify a first reference image from the set of reference images that has been determined to match the input image;
    determine an initial audit result for the shelf depicted in the input image based on a first set of reference items associated with the first reference image;
    determine a first region of the input image that differs from a corresponding first region of the first reference image; and
    modify the initial audit result for the shelf depicted in the input image based on an item depicted in the first region of the input image.

11. A tangible machine readable medium as defined in claim 10 wherein the set of reference images is associated with a respective set of reference image signatures, and the machine readable instructions, when executed, further cause the machine to:
    determine an input image signature for the input image; and
    compare the input image signature to the set of reference image signatures; and
    determining that the first reference image matches the input image when a first reference image signature associated with the first reference image is determined to match the input image signature.

12. A tangible machine readable medium as defined in claim 10 wherein to modify the initial audit result, the machine readable instructions, when executed, further cause the machine to:
    identify the item depicted in the first region of the input image; and
    register the item as being associated with the shelf depicted in the input image.

13. A tangible machine readable medium as defined in claim 10 wherein the machine readable instructions, when executed, further cause the machine to:
    determine a difference image representing differences between pixels of the input image and respective pixels of the first reference image; and
    determine the first region of the input image to correspond to a first region of the difference image in which a neighborhood of pixels meets or exceeds a difference threshold.

14. An apparatus to perform shelf auditing, the apparatus comprising;
    a reference database to store a set of reference images depicting reference shelves displaying respective sets of reference items, the set of reference images and the respective sets of reference items associated with the respective reference images being obtained from prior audits of the reference shelves;

a reference image identifier to:
   compare an input image depicting a shelf to be audited with the set of reference images; and
   identify a first reference image from the set of reference images that has been determined to match the input image and that satisfies a matching criterion;

an image auditor to determine an initial audit result for the shelf depicted in the input image based on a first set of reference items associated with the first reference image, the initial audit result to indicate that the first set of reference items is displayed by the shelf depicted in the input image; and a difference determiner to determine a first region of the input image that differs from a corresponding first region of the first reference image, wherein the image auditor is to modify the initial audit result for the shelf depicted in the input image based on an item depicted in the first region of the input image.

15. An apparatus as defined in claim 14 wherein the reference database is also to store a set of reference image signatures associated respectively with the set of reference images, and the reference image identifier comprises:

a signature generator to generate an input image signature for the input image; and a signature comparator to:
      compare the input image signature to the set of reference image signatures; and
      determine that the first reference image matches the input image when a first reference image signature associated with the first reference image is determined to match the input image signature.

16. An apparatus as defined in claim 14 wherein to modify the initial audit result, the image auditor is further to:
   identify the item depicted in the first region of the input image; and
   register the item as being associated with the shelf depicted in the input image.

17. An apparatus as defined in claim 14 wherein the difference determiner is to:
   determine a difference image representing differences between pixels of the input image and respective pixels of the first reference image; and
   determining the first region of the input image to correspond to a first region of the difference image in which a neighborhood of pixels meets or exceeds a difference threshold.

* * * * *